United States Patent
Jung et al.

(10) Patent No.: US 9,608,697 B2
(45) Date of Patent: Mar. 28, 2017

(54) WIRELESS POWER TRANSMITTING APPARATUS AND METHOD THEREOF

(71) Applicants: Chun-Kil Jung, Seoul (KR); Yoon-Sang Kuk, Gwacheon-si (KR)

(72) Inventors: Chun-Kil Jung, Seoul (KR); Yoon-Sang Kuk, Gwacheon-si (KR)

(73) Assignee: HANRIM POSTECH CO., LTD., Suwon-si, Gyeonggi-Do (KR)

( * ) Notice: Subject to any disclaimer, the term of this patent is extended or adjusted under 35 U.S.C. 154(b) by 647 days.

(21) Appl. No.: 13/624,116

(22) Filed: Sep. 21, 2012

(65) Prior Publication Data

US 2013/0069586 A1  Mar. 21, 2013

(30) Foreign Application Priority Data

Sep. 21, 2011 (KR) .................. 10-2011-0094960

(51) Int. Cl.
*H02J 7/00* (2006.01)
*H04B 5/00* (2006.01)

(52) U.S. Cl.
CPC ......... H04B 5/0037 (2013.01); H04B 5/0081 (2013.01)

(58) Field of Classification Search
USPC ........................................................ 320/108
See application file for complete search history.

(56) References Cited

U.S. PATENT DOCUMENTS

| | | | |
|---|---|---|---|
| 7,948,208 B2 * | 5/2011 | Partovi et al. | 320/108 |
| 2007/0182367 A1 | 8/2007 | Partovi | 320/108 |
| 2011/0140653 A1 * | 6/2011 | Jung et al. | 320/108 |
| 2012/0313577 A1 * | 12/2012 | Moes et al. | 320/108 |

FOREIGN PATENT DOCUMENTS

| | | |
|---|---|---|
| CN | 101828320 A | 9/2010 |
| CN | 102089952 A | 6/2011 |
| JP | 2003224937 A | 8/2003 |
| JP | 2008-283789 | 11/2008 |
| JP | 2010-200497 | 9/2010 |
| WO | WO 2010/118191 A1 | 10/2010 |
| WO | WO 2011/077488 A1 | 6/2011 |

OTHER PUBLICATIONS

Korean Office Action dated Dec. 11, 2012, issued in corresponding Korean Patent Application No. 10-2011-0094960.
Chinese Office Action dated Aug. 24, 2015, issued to Chinese Application No. 201210352483.2.
Japanese Office Action dated Sep. 27, 2016, issued by the Japanese Patent Office in corresponding application JP 2012-208782.

* cited by examiner

*Primary Examiner* — Eric Lee
(74) *Attorney, Agent, or Firm* — Envision USA Inc.

(57) ABSTRACT

Disclosed herein are a wireless power transmitting apparatus and method of wirelessly transmitting a power to a power receiving apparatus by selectively using one central coil and two side coils, wherein in the case in which each of the one central coil and the two side coils transmits the power, a reception power amount received by the power receiving apparatus is judged, at least one of the one central coil and the two side coils is selected as a power transmitting coil that is to transmit the power by the judged reception power amount, and the power is wirelessly transmitted to the power receiving apparatus through the selected power transmitting coil.

12 Claims, 11 Drawing Sheets

FIG. 3

| POSITION POWER RECEIVING APPARATUS | POWER TRANSMITTING COIL | | | REMARK |
|---|---|---|---|---|
| | FIRST SIDE COIL | CENTRAL COIL | SECOND SIDE COIL | |
| UPPER PORTION OF FIRST SIDE COIL | O | X | X | |
| UPPER PORTION OF CENTRAL COIL | X | O | X | |
| UPPER PORTION OF SECOND SIDE COIL | X | X | O | |
| UPPER PORTION OF FIRST SIDE COIL AND CENTRAL COIL | O | O | X | EACH OF FIRST SIDE COIL AND CENTRAL COIL GENERATE SYNTHETIC MAGNETIC FIELD ON HALVES |
| UPPER PORTION OF SECOND SIDE COIL AND CENTRAL COIL | X | O | O | EACH OF SECOND SIDE COIL AND CENTRAL COIL GENERATE SYNTHETIC MAGNETIC FIELD BY HALF |

WIRELESS POWER TRANSMITTING APPARATUS AND METHOD THEREOF

CROSS-REFERENCE TO RELATED APPLICATIONS

This application claims the benefit of Korean Patent Application No. 10-2011-0094960, filed on Sep. 21, 2011, in the Korean Intellectual Property Office, the disclosure of which is incorporated herein by reference.

BACKGROUND OF THE INVENTION

1. Field of the Invention

The present invention relates to a wireless power transmitting apparatus and method of selecting at least one of one central coil disposed at the center of a core and two side coils each disposed at left and right sides of the core as a power transmitting coil according to a position at which a power receiving apparatus is positioned and wirelessly transmitting a power to the power receiving apparatus.

2. Description of the Related Art

Generally, various portable terminals such as a cellular phone, a personal digital assistant, and the like, have been mounted with a power receiving apparatus supplying an operation power thereto.

The power receiving apparatus, which is charged with a power supplied from an external charging apparatus and supplies the charged power as an operation power to the portable terminal to operate the portable terminal, may include a battery cell module charged with the power, a charging and discharging circuit inputting the power supplied from the external charging apparatus to charge the power in the battery cell module and discharging the power charged in the battery cell module to supply the discharged power as the operation power to the portable terminal, and the like.

As a scheme of electrically connecting the charging apparatus to the power receiving apparatus, a terminal connection scheme of directly connecting a terminal through which the power is output in the charging apparatus and a terminal to which the power is input in the power receiving apparatus to each other through a cable, a connector, and the like, has been known.

In the terminal connection scheme, the terminal of the charging apparatus and the terminal of the power receiving apparatus have the different potential difference.

Therefore, in the case in which the terminal of the charging apparatus and the terminal of the power receiving apparatus are connected to each other or disconnected from each other, an instantaneous discharging phenomenon may occur.

This instantaneous discharging phenomenon causes abrasion of the terminal of the charging apparatus and the terminal of the power receiving apparatus. In addition, in the case in which foreign materials are accumulated in the terminal of the charging apparatus and the terminal of the power receiving apparatus, the heat may occur in the foreign materials due to the instantaneous discharging phenomenon, so there is a risk that an accident such as a fire, or the like, will occur.

In addition, the power charged in the battery cell module charged in the power receiving apparatus is naturally discharged to the outside through the terminal of the power receiving apparatus due to moisture, or the like, so a lifespan of the power receiving apparatus may be decreased and performance of the power receiving apparatus may be deteriorated.

Recently, a wireless power transmitting apparatus wirelessly transmitting the power to the power receiving apparatus has been suggested in order to solve several problems of the terminal connection scheme as described above.

The wireless power transmitting apparatus wirelessly transmits the power in, for example, an electromagnetic induction scheme. In addition, the power receiving apparatus receives the power wirelessly transmitted by the wireless power transmitting apparatus and charges the received power in the battery cell module.

A number of efforts have been conducted in order for the wireless power transmitting apparatus to wirelessly transmit the power stably at high efficiency and in order for the power receiving apparatus to receive the power transmitted by the wireless power transmitting apparatus as much as possible to charge the power in the battery cell module.

Since coupling between terminals is not made between the wireless power transmitting apparatus and the power receiving apparatus, it is required for the power receiving apparatus to be positioned at a charging position of a charger included in the wireless power transmitting apparatus.

However, a case in which a user does not position the power receiving apparatus at the charging position of the charger has frequently occurred. In addition, even though the user positions the power receiving apparatus at the normal position of the charger, when vibration is generated in the portable terminal mounted with the power receiving apparatus due to reception of a call signal, or the like, a case in which the power receiving apparatus moves to deviate from the charging position has frequently occurred

SUMMARY OF THE INVENTION

An object of the present invention is to provide a wireless power transmitting apparatus and method capable of optimally transmitting a power regardless of a position at which a power receiving apparatus is positioned.

Another object of the present invention is to provide a wireless power transmitting apparatus and method capable of optimally transmitting a power even though vibration, or the like, occurs in a portable terminal in the state in which the power is charged in a power receiving apparatus mounted in the portable terminal to move the power receiving apparatus.

Objects of the present invention are not limited to the above-mentioned objects. That is, other objects that are not mentioned may be obviously understood by those skilled in the art to which the present invention pertains from the following description.

According to an exemplary embodiment of the present invention, there is provided a wireless power transmitting apparatus including: a core assembly including one central coil, and two side coils to transmit a power to a power receiving apparatus, the two side coil including a first side coil and a second side coil; and a power transmitting unit configured to receive a reception power amount measured by the power receiving apparatus receiving wireless power transmitted from each of the one central coil and the two side coils from the power receiving apparatus, to select any one of the one central coil and the two side coils as a power transmitting coil or selecting the one central coil and any one of the two side coils as a power transmitting coil by the received reception power amount, and to transmit the power to the power receiving apparatus through the selected power transmitting coil.

The power transmitting unit may include: a power transmission controlling unit configured to control the transmission of the power; a driving driver configured to generate a driving signal under the control of the power transmission controlling unit; a series resonant converter configured to switch a direct current (DC) power by the driving signal to generate a first power and a second power and apply the first power to the central coil; a side coil driving unit configured to selectively generate a first side coil driving signal and a second side coil driving signal under the control of the power transmission controlling unit so as to allow the second power to be applied to at least one of the first side coil and the second side coil; and a signal receiving unit configured to receive a reception power amount signal and a charging completion signal transmitted by the power receiving apparatus to provide the reception power amount signal and the charging completion signal to the power transmission controlling unit.

The wireless power transmitting apparatus may further include a first switching unit and a second switching unit selectively connected to the first side coil and the second side coil by the first side coil driving signal and the second side coil driving signal to selectively apply the second power to the first side coil and the second side coil.

A phase difference between the first power applied to the central coil and the second power applied to the first side coil or the second side coil may be 180 degrees.

The series resonant converter may allow the first power applied to the central coil and the second power applied to the first side coil or the second side coil to have the phase difference of 180 degrees therebetween in the case in which both of the first power and the second power are generated.

The core assembly may include: the central coil installed at a first level; the first side coil and the second side coil installed at a second level different from the first level and disposed so that portions thereof are overlapped with the central coil, respectively; and a magnetic core formed to receive the central coil, the first side coil, and the second side coil therein.

The central coil may have a different size from that of each of the first side coil and the second side coil.

A width of the central coil in a first direction may be narrower than that of each of the first side coil and the second side coil in the first direction.

The width of the central coil in the first direction may be in the range of 30 to 50% of the sum of widths of the first side coil and the second side coil in the first direction.

A width of the central coil in a second direction may be the same as that of each of the first side coil and the second side coil in the second direction.

The central coil may be disposed on the first side coil and the second side coil.

The first side coil and the second side coil may have the same size.

The first side coil and the second side coil may be a first conductive pattern and a second conductive pattern formed as patterns on a base, which is an insulator, disposed at a lower side of the central coil, respectively.

According to another exemplary embodiment of the present invention, there is provided wireless power transmitting method including: receiving, by a power transmission controlling unit, each reception power amount measured in a power receiving apparatus when one central coil and two side coils are selected one by one by to transmit each power to the power receiving apparatus; and selecting, by a power transmission controlling unit, any one of the one central coil and the two side coils or the one central coil and any one of the two side coils by the received reception power amount to apply the power to the selected coil, thereby transmitting the power to the power receiving apparatus.

The wireless power transmitting method may further include: judging whether or not the reception power amount received from the power receiving apparatus has been decreased; sequentially applying, by the power transmission controlling unit, the power to the one central coil and the two side coils in the case in which it is judged that the reception power amount has been decreased, thereby transmitting the power to the power receiving apparatus and again judging the reception power amount transmitted from the power receiving apparatus; and selecting any one of the one central coil and the two side coils or the one central coil and any one of the two side coils by the received reception power amount judged by the power transmission controlling unit and applying the power to the selected coil to transmit the power to the power receiving apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a table describing a coil selected as a power transmitting coil among one central coil and two side coils in the wireless power transmitting apparatus according to the exemplary embodiment of the present invention;

DETAILED DESCRIPTION OF THE EMBODIMENTS

Figure 1:
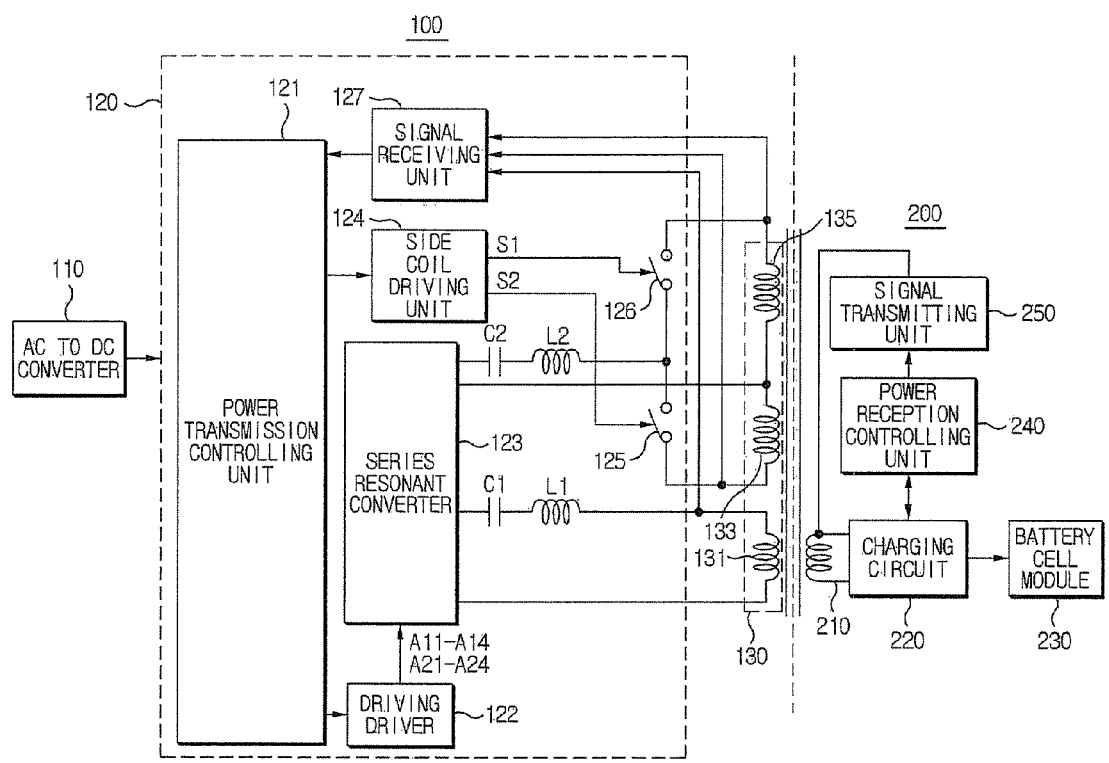
FIG. 1 is a diagram showing the entire configuration of a wireless power transmitting system including a wireless power transmitting apparatus according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The following detailed description is only an example and only illustrates exemplary embodiments of the present invention. In addition, a principle and a concept of the present invention are provided in order to most usefully and easily describe the present invention.

Therefore, for basic understanding of the present invention, a more detailed structure than necessary will not be provided, and several forms of the present invention that may be executed by those skilled in the art will be illustrated in the accompanying drawings.

FIG. 1 is a diagram showing the entire configuration of a wireless power transmitting system including a wireless power transmitting apparatus according to an exemplary embodiment of the present invention. The wireless power transmitting system may include the wireless power transmitting apparatus 100 according to the exemplary embodiment of the present invention wirelessly transmitting a power and a power receiving apparatus 200 receiving the power transmitted by the wireless power transmitting apparatus 100, charged with the received power, and supplying the charged power as an operation power to a portable terminal (not shown).

Here, the wireless power transmitting apparatus 100 may include an alternate current (AC) to direct current (DC) converter 110, a power transmitting unit 120, and a core assembly 130.

The AC to DC converter 110 converts commercial an AC power input from the outside into a DC power and supplies the converted DC power as the operation power to the power transmitting unit 120.

In the present specification, although the case in which the AC to DC converter 110 is included in the power transmitting apparatus 100 has been described by way of example, the AC to DC converter 110 may also be configured to be separately provided at an outer side of the power transmitting apparatus 100 to supply the DC power to the power transmitting unit 120, in implementing the present invention.

The core assembly 130 may include a core 400 to be described below, one central coil 131 positioned at the center of the core 400, and two side coils 133 and 135, that is, a first side coil 133 and a second side coil 135, positioned at left and right sides of the core 400.

The power transmitting unit 120 switches the DC power converted by the AC to DC converter 110 to generate a first AC power and a second AC power, supplies the generated first AC power to one central coil 131 included in the core assembly 130, and selectively supplies the generated second AC power to the first side coil 133 and the second side coil 135, thereby allowing the power to be wireless transmitted.

The power transmitting unit 120 may include a power transmission controlling unit 121, a driving driver 122, a series resonant converter 123, a side coil driving unit 124, a first switching unit 125, a second switching unit 126, and a signal receiving unit 127.

The power transmission controlling unit 121 judges a reception power amount received by the power receiving apparatus 200 in the case in which each of the one central coil 131 and the two side coils 133 and 135 transmits the power, selects at least one of the one central coil 131 and the two side coils 133 and 135 as a power transmitting coil by the judged reception power amount, and controls that the power is transmitted to the power receiving apparatus 200 through the selected power transmitting coil.

The driving driver 122 generates driving signals A11 to A14 allowing the power to be transmitted to the power receiving apparatus 200 by using the one central coil 131 and driving signals A21 to A24 allowing the power to be transmitted to the power receiving apparatus 200 by selectively using the two side coils 133 and 135, under the control of the power transmission controlling unit 121.

The series resonant converter 123 switches the DC power output by the AC to DC converter 110 by the driving signals A11 to A14 and A21 to A24 generated by the driving driver 122 to generate the first AC power to be transmitted by using the central coil 131 and the second AC power to be transmitted by selectively using the two side coils 133 and 135.

The side coil driving unit 124 selectively generates a first side coil driving signal S1 and a second side coil driving signal S2 allowing the second AC power to be selectively supplied to the two side coils 133 and 135 under the control of the power transmission controlling unit 121.

The first switching unit 125 and the second switching unit 126 are selectively connected to the first side coil S1 and the second side coil S2 by the first side coil driving signal S1 and the second side coil driving signal S2 to allow the second AC power generated by the series resonant converter 123 to be selectively supplied to the first side coil 133 and the second side coil 135.

The signal receiving unit 127 receives various signals including a reception power amount signal transmitted by the power receiving apparatus 200, a charging completion signal, and the like, and provides the received signals to the power transmission controlling unit 121.

The power receiving apparatus 200 may include a power receiving coil 210, a charging circuit 220, a battery cell module 230, a power reception controlling unit 240, and a signal transmitting unit 250.

The power receiving coil 210 receives the AC power that the wireless power transmitting apparatus 100 transmits through the core assembly 130.

The charging circuit 220 converts the AC power received by the power receiving coil 210 into a DC power.

The battery cell module 230 is charged with the DC power converted by the charging circuit 220.

The power reception controlling unit 240 controls that the charging circuit 220 charges the power in the battery cell module 230, judges a reception power amount received by the power receiving coil 210 and whether the charging of the battery cell module 230 is completed to generate various signal including the reception power amount signal and the charging completion signal, and controls that the generated various signals are transmitted to the wireless power transmitting apparatus 100 through the power receiving coil 210.

The signal transmitting unit 250 generates various signals including the reception power amount signal and the charging completion signal under the control of the power reception controlling unit 240 and transmits the generated signals to the wireless power transmitting apparatus 100 through the power receiving coil 210.

Reference signs C1 and C2, and L1 and L2 that are not described in FIG. 1 indicate, respectively, capacitors and coils each connected in series with the central coil 131 and the two side coils 133 and 135 to allow series resonance to be generated in the central coil 131 and the two side coils 133 and 135, in the case in which the first AC power and the second AC power are selectively supplied to the central coil 131 and the two side coils 133 and 135 and transmitted to the power receiving apparatus 200.

Figure 2:
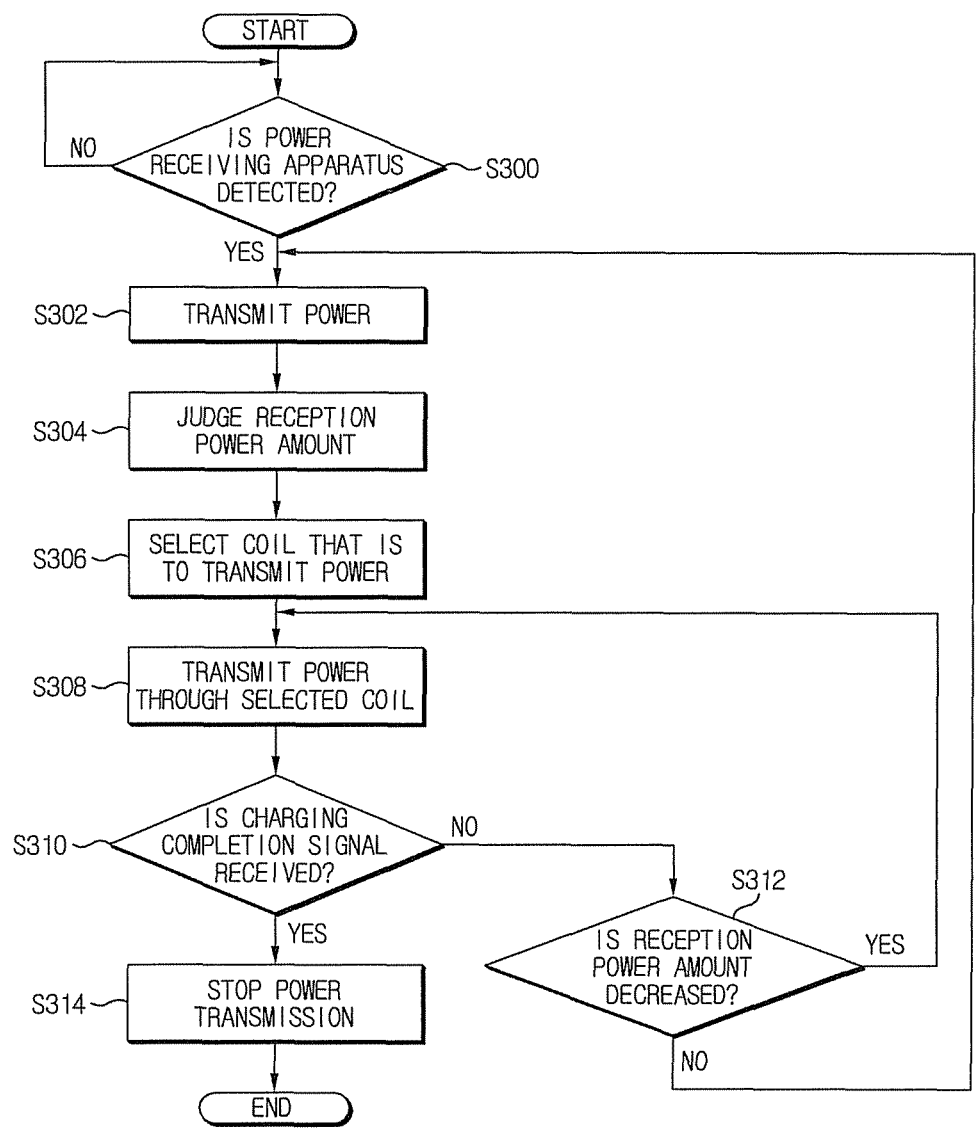
FIG. 2 is a signal flow chart showing an operation of a power transmission controlling unit of the wireless power transmitting apparatus according to a wireless power transmitting method according to the exemplary embodiment of the present invention.

In the wireless power transmitting system having the above-mentioned configuration, as shown in FIG. 2, the power transmission controlling unit 121 judges whether or not the power receiving apparatus 200 is positioned on a charger (not shown) at which the core assembly 130 is installed (S300).

Here, the core assembly 130 is provided at a lower portion of the charger, and the operation of judging whether or not the power receiving apparatus 200 is positioned on the charger by using the central coil 131 and the two side coils 133 and 135 of the core assembly 130 has been well known. Therefore, a detailed description thereof will be omitted.

In the case in which it is judged in step (S300) that the power receiving apparatus 200 is positioned on the charger, the power transmission controlling unit 121 sequentially selects one central coil 131 and two side coils 133 and 135 one by one and supplies the power to the selected coil, thereby transmitting the power receiving apparatus 200 (S302).

That is, the power transmission controlling unit 121 controls the driving driver 122 to generate the driving signals A11 to A14, and the series resonant converter 123 switches the DC power output from the AC to DC converter 110 by the generated driving signals A11 to A14 to generate the first AC power. In this case, the first AC power generated by the series resonant converter 123 is applied to the one central coil 131 through the capacitor C1 and the coil L1 to generate resonance in the central coil 131, such that the power is wirelessly transmitted to the power receiving apparatus 200.

After the power is supplied to the central coil 131 to thereby be transmitted to the power receiving apparatus 200, the power transmission controlling unit 121 controls the driving driver 122 to generate the driving signals A21 to A24, and the series resonant converter 123 switches the DC power output from the AC to DC converter 110 by the generated driving signals A21 to A24 to generate the second AC power. In addition, the power transmission controlling unit 121 controls the side coil driving unit 124 to generate the first side coil driving signal S1, which is applied to the first switching unit 125 to connect the first switching unit 125. In this case, the second AC power generated by the series resonant converter 123 is applied to the first side coil 133 through the capacitor C2, the coil L2, and the first switching unit 125 to generate resonance in the first side coil 133, such that the power is wirelessly transmitted to the power receiving apparatus 200.

After the power is supplied to the first side coil 133 to thereby be transmitted to the power receiving apparatus 200, the power transmission controlling unit 121 controls the driving driver 122 to continuously generate the driving signals A21 to A24, and the series resonant converter 123 switches the DC power output from the AC to DC converter 110 by the generated driving signals A21 to A24 to generate the second AC power. In addition, the power transmission controlling unit 121 controls the side coil driving unit 124 to generate the second side coil driving signal S2, which is applied to the second switching unit 126 to connect the second switching unit 126. In this case, the second AC power generated by the series resonant converter 123 is applied to the second side coil 135 through the capacitor C2, the coil L2, and the second switching unit 126 to generate resonance in the second side coil 135, such that the power is wirelessly transmitted to the power receiving apparatus 200.

In the present specification, although the case in which the power transmission controlling unit 121 sequentially selects the central coil 131, the first side coil 133, and the second side coil 135 to transmit the power to the power receiving apparatus 200 has been described by way of example, a sequence in which the power is transmitted to the power receiving apparatus 200 through the central coil 131, the first side coil 133, and the second side coil 135 may be arbitrarily changed, in implementing the wireless power transmitting apparatus 100 according to the exemplary embodiment of the present invention.

In the state in which the power transmission controlling unit 121 sequentially selects the central coil 131, the first side coil 133, and the second side coil 135 to transmit the power to the power receiving apparatus 200, the power transmission controlling unit 121 judges the reception power amount received by the power receiving apparatus 200 in the case in which the power is transmitted by using each of the central coil 131 and the two side coils 133 and 135 (S304).

That is, in the case in which the power is transmitted to the power receiving apparatus 200 by sequentially using each of the central coil 131 and the two side coils 133 and 135, the transmitted power is received by the power receiving coil 210 of the power receiving apparatus 200, and the received power is converted into the DC power and then charged in the battery cell module 230 by the charging circuit 220.

In this case, the power reception controlling unit 240 of the power receiving apparatus 200 judges the reception power amount received by the power receiving coil 210 through the power charged in the battery cell module 230 by the charging circuit 220.

In addition, the power reception controlling unit 240 controls the signal transmitting unit 250 by the judged reception power amount to generate the reception power amount signal, which is induced to the central coil 131 and the two side coils 133 and 135 through the power receiving coil 210. The reception power amount signal induced to the central coil 131 and the two side coils 133 and 135 is received by the signal receiving unit 127 and is provided to the power transmission controlling unit 121. The power transmission controlling unit 121 receives the reception power amount signal output by the signal receiving unit 127 to judge the reception power amount received by the power receiving apparatus 200 when the power is transmitted by using each of the central coil 131 and the two side coils 133 and 135.

When the reception power amount is judged, the power transmission controlling unit 121 selects at least one coil capable of transmitting the power to the power receiving apparatus 200 in an optimal state among the central coil 131 and the two side coils 133 and 135 as a power transmitting coil that is to transmit the power, by using the judged reception power amount (S306).

For example, in the present invention, as shown in FIG. 3, in the case in which it is judged that the power receiving apparatus 200 is positioned on the first side coil 133, such that the power may be transmitted in the optimal state through only the first side coil 133, the power transmission controlling unit 121 selects only the first side coil 133 as the power transmitting coil.

In the case in which it is judged that the power receiving apparatus 200 is positioned on the central coil 131, such that the power may be transmitted in the optimal state through only the central coil 131, the power transmission controlling unit 121 selects only the central coil 131 as the power transmitting coil.

In the case in which it is judged that the power receiving apparatus 200 is positioned on the second side 135, such that the power may be transmitted in the optimal state through only the second side coil 135, the power transmission controlling unit 121 selects only the second side coil 135 as the power transmitting coil.

Further, in the present invention, in the case in which it is judged that the power receiving apparatus 200 is positioned on the first side coil 133 and the central coil 131, such that the power may be transmitted in the optimal state through the first side coil 133 and the central coil 131, the power transmission controlling unit 121 selects the first side coil 133 and the central coil 131 as the power transmitting coil.

In the case in which it is judged that the power receiving apparatus 200 is positioned on the central coil 131 and the second side coil 135, such that the power may be transmitted in the optimal state through the central coil 131 and the second side coil 135, the power transmission controlling unit 121 selects the central coil 131 and the second side coil 135 as the power transmitting coil.

When the power transmitting coil to transmit the power is selected through the above-mentioned process, the power transmission controlling unit 121 controls the driving driver 122 and the side coil driving unit 124 to selectively supply the first AC power and the second AC power to the central coil 131 and the two side coils 133 and 135 selected as the power transmitting coils, thereby allowing the supplied AC power to be transmitted to the power receiving apparatus 200 (S308).

In this state, the power transmission controlling unit 121 receives the signal output by the signal receiving unit 127 to judge whether or not the charging completion signal has been received from the power receiving apparatus 200 (S310), and judges whether or not the reception power amount received by the power receiving apparatus 200 has been decreased by using the reception power amount signal received by the signal receiving unit 127 (S312) in the case in which it is judged that the charging completion signal has not been received.

In the case in which it is judged that the charging completion signal has not been received and the reception power amount has not been decreased, the power transmission controlling unit 121 returns to step (S308) to repeatedly perform an operation of transmitting the power to the power receiving apparatus 200 through the selected power transmitting coil and receiving the signal output by the signal receiving unit 127 to judge whether or not the charging completion signal has been received and whether or not the reception power amount has been decreased.

In this state, when vibration, or the like, occurs in a portable terminal in which the power receiving apparatus 200 is mounted to move the power receiving apparatus 200, an amount of power received by the power receiving apparatus 200 is decreased.

In this case, the power reception controlling unit 240 of the power receiving apparatus 200 controls the signal transmitting unit 250 to generate the reception power amount signal informing that the reception power amount has been decreased. The generated reception power amount signal is transmitted to the wireless power communication apparatus 100.

The power transmission controlling unit 121 of the wireless power communication apparatus 100 receives the reception power amount signal output by the signal receiving unit 127 to judge whether or not the reception power amount of the power receiving apparatus 200 has been decreased, and returns to step (S302) in the case in which it is judged that the reception power amount has been decreased, thereby repeatedly performing an operation of transmitting the power to the power receiving apparatus 200 through each of the central coil 131 and the two side coils 133 and 135, judging the reception power amount, selecting at least one coil capable of transmitting the power to the power receiving apparatus 200 in the optimal state as the power transmitting coil by the judged reception power amount, and selectively controlling the driving driver 122 and the side coil driving unit 124 according to the selected power transmission coil to allow the power to be transmitted to the power receiving unit 200 in the optimal state, as described above.

In the case in which the battery cell module 230 is fully charged in the state in which the power is transmitted to the power receiving apparatus 200 in the optimal state through the above-mentioned process, the power reception controlling unit 240 controls the signal transmitting unit 250 to generate the charging completion signal, which is transmitted to the wireless power transmitting apparatus 100 through the power receiving coil 210.

The power transmission controlling unit 121 of the wireless power transmitting apparatus 100 receives the signal output by the signal receiving unit 127 to judge whether or not the charging completion signal has been received and stops the transmission of the power in the case in which it is judged that the charging completion signal has been received (S314).

Figure 4:
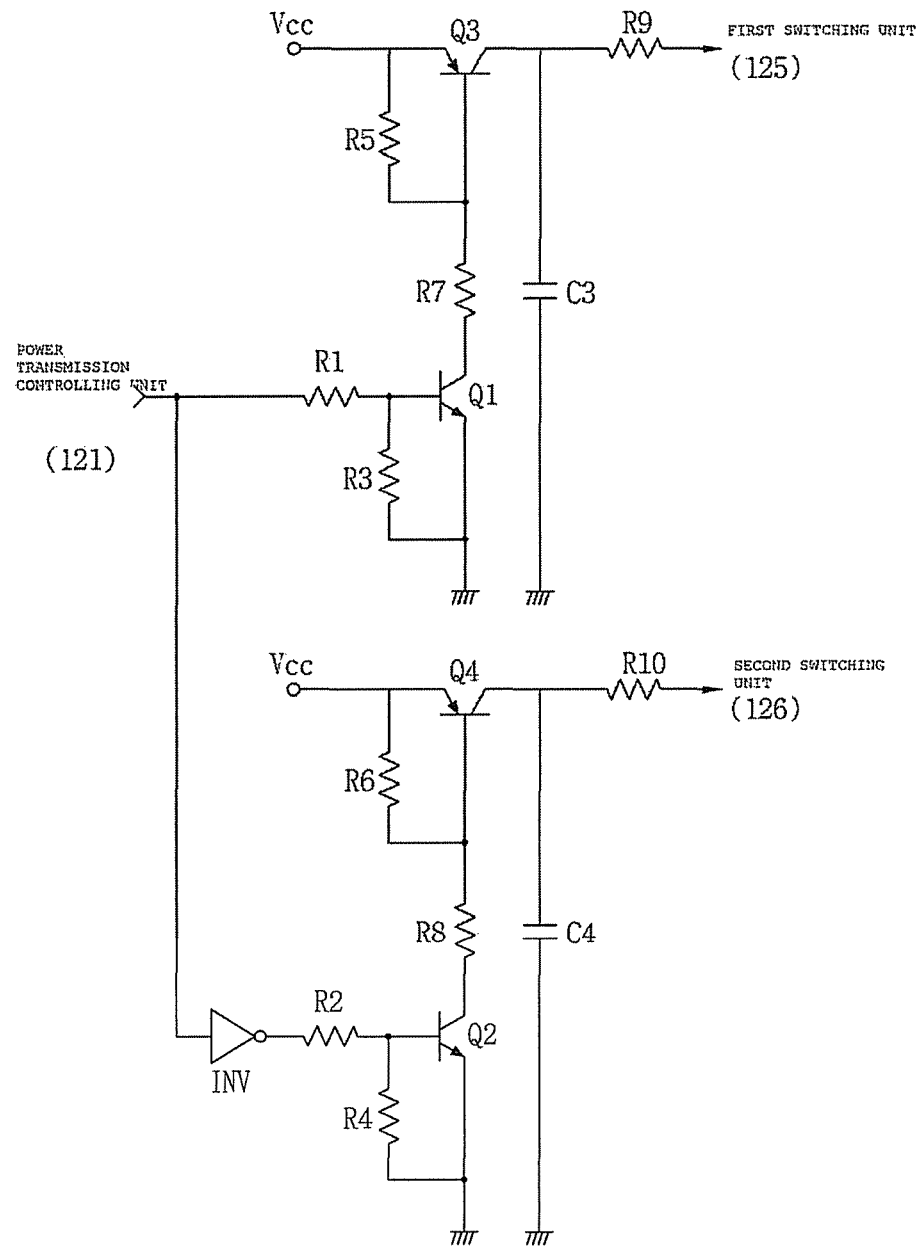
FIG. 4 is a circuit diagram showing a detailed configuration of a side coil driving unit in the wireless power transmitting apparatus according to the exemplary embodiment of the present invention.

FIG. 4 is a circuit diagram showing a detailed configuration of a side coil driving unit 124 in the wireless power transmitting apparatus 100 according to the exemplary embodiment of the present invention. Referring to FIG. 4, in the side coil driving unit 124 according to the exemplary embodiment of the present invention, a resistor R3 and a transistor Q1 are connected to an output terminal of the power transmission controlling unit 121 outputting a control signal through a resistor R1, and a resistor R4 and a transistor Q2 are connected to the output terminal of the power transmission controlling unit 121 outputting the control signal through an inverter INV and a resistor R2.

In addition, the transistors Q3 and Q4 have emitters connected to a power supply terminal Vcc and bases connected to the power supply terminal Vcc through the resistors R5 and R6, respectively, and connection points between the resistors R5 and R6 and the transistors Q3 and Q4 are connected to collectors of the transistors Q1 and Q2 through resistors R7 and R8, respectively.

Further, the transistors Q3 and Q4 have collectors connected to capacitors C3 and C4, respectively, and connection points between the collectors of the transistors Q3 and Q4 and the capacitors C3 and C4 are configured to output the first side coil driving signal S1 and the second side coil driving signal S2 to the first switching unit 125 and the second switching unit 126 through resistors R9 and R10, respectively.

In the side coil driving unit 124 according to the exemplary embodiment of the present invention configured as described above, when the power transmission controlling unit 121 outputs a high potential signal of logic 1 as a control signal in the state in which an operation power is applied to the power supply terminal Vcc, the high potential signal is applied to the base of the transistor Q1 through the resistor R1.

In this case, the transistor Q1 is turned on, the operation power of the power supply terminal Vcc flows to a ground through the resistors R5 and R7 and the transistor Q1, such that the transistor Q3 is turned on, and the operation power of the power supply terminal Vcc is output as the first side coil driving signal S1 through the resistor R9 in the state in which noise, or the like, is removed by the capacitor C3 through the transistor Q3, such that the first switching unit 125 becomes a connection state (switch on state).

In this case, the high potential signal of logic 1 output by the power transmission controlling unit 121 is converted into a low potential signal of logic 0 through the inverter INV and then applied to the base of the transistor Q2, such that the transistor Q2 is turned off. As the transistor Q2 is turned off, the transistor Q4 is also turned off, such that the second side coil driving signal S2 is not output and the second switching unit 126 becomes a disconnection state (switch off state).

On the other hand, when the power transmission controlling unit 121 outputs a low potential signal of logic 0 as a control signal, the low potential signal is applied to the base of the transistor Q1, such that the transistor Q1 is turned off. As the transistor Q1 is turned off, the transistor Q3 is also turned off, such that the first side coil driving signal S1 is not output and the first switching unit 125 becomes a disconnection state (switch off state).

In this case, the lower potential signal of logic 0 output by the power transmission controlling unit 121 is converted into a high potential signal of logic 1 through the inverter INV and then applied to the base of the transistor Q2, such that the transistor Q2 is turned on. As the transistor Q2 is turned on, the transistor Q4 is also turned on, such that the second side coil driving signal S2 is output and the second switching unit 126 becomes a connection state (switch on state).

Figure 5:
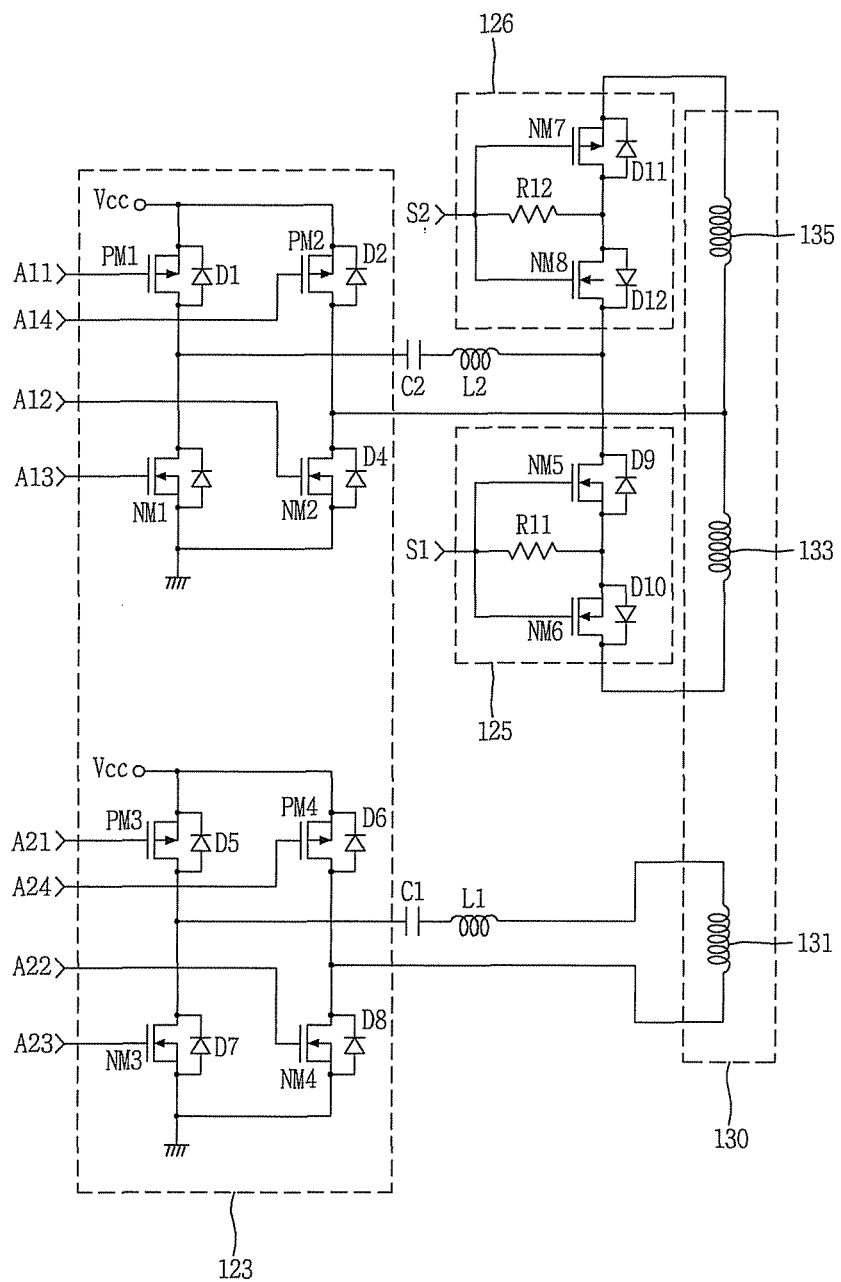
FIG. 5 is a circuit diagram showing detailed configurations of a series resonant converter, a first switching unit, and a second switching unit in the wireless power transmitting apparatus according to the exemplary embodiment of the present invention.

FIG. 5 is a circuit diagram showing detailed configurations of a series resonant converter 123, a first switching unit 125, and a second switching unit 126 in the wireless power transmitting apparatus according to the exemplary embodiment of the present invention. Referring to FIG. 5, the series resonant converter 123 is configured to include p-channel metal oxide semiconductor (PMOS) transistors and n-channel metal oxide semiconductor (NMOS) transistors PM1 and NM1, PM2 and NM2, PM3 and NM3, and PM4 and NM4 connected in series with each other between the power supply terminal Vcc and the ground, respectively, and diodes D1 to D8 connected between sources and drains of the PMOS transistors PM1 t PM4 and the NMOS transistors NM1 to NM4, respectively, such that a first power is output at connection points between the PMOS and NMOS transistors PM1 and NM1, and PM2 and NM2 and a second power is output at connection points between the PMOS and NMOS transistors PM3 and NM3, and PM4 and NM4 to thereby be applied to the central coil 131.

In addition, the first and second switching units 125 and 126 according to the exemplary embodiment of the present invention are connected so that the first and second side coil driving signals S1 and S2 are applied to the gates of the NMOS transistors NM5 and NM6, and NM7 and NM8, respectively, and connection points thereof are commonly connected to the sources of the NMOS transistors NM5 and NM6, and NM7 and NM8 through resistors R11 and R12, respectively, and diodes D9 to D12 are connected between the sources and the drains of the NMOS transistors NM5 to NM8, respectively.

In addition, the drains of the NMOS transistors NM5 and NM8 are connected to each other, the first side coil 133 and the second side coil 135 are connected in series with each other between the drains of the NMOS transistors NM6 and NM7, and the second power output from the series resonant converter 123 is applied to a connection point between the drains of the NMOS transistors NM5 and NM8 and a connection point between the first and second side coils 133 and 135.

In the present invention configured as described above, in the case in which the first side coil driving signal S1 is output to the side coil driving unit 124, both of the NMOS transistors NM5 and NM6 of the first switching unit 125 are turned on, such that the first switching unit 125 becomes the connection state.

In the case in which the second side coil driving signal S2 is output to the side coil driving unit 124, both of the NMOS transistors NM7 and NM8 of the second switching unit 126 are turned on, such that the second switching unit 126 becomes the connection state.

Here, since the side coil driving unit 124 selectively outputs the first and second side coil driving signals S1 and S2, the first and second switching units 125 and 126 do not simultaneously become the connection or disconnection state. That is, when any one of the first and second switching units 125 and 126 is in the connection state, the other thereof becomes the disconnection state.

In addition, in the case in which the PMOS transistor PM3 and the NMOS transistor NM4 of the series resonant converter 123 are turned on and the PMOS transistor PM4 and the NMOS transistor NM3 thereof are turned off by the driving signals A21 to A24 output by the driving diver 122, the operation power of the power supply terminal Vcc sequentially flows through the PMOS transistor PM3, the capacitor C1, the coil L1, the central coil 131, and the NMOS transistor NM4. Further, in the case in which the PMOS transistor PM3 and the NMOS transistor NM4 of the series resonant converter 123 are turned off and the PMOS transistor PM4 and the NMOS transistor NM3 thereof are turned on by the driving signals A21 to A24 output by the driving diver 122, the operation power of the power supply terminal Vcc sequentially flows through the PMOS transistor PM4, the central coil 131, the coil L1, the capacitor C1, and the NMOS transistor NM3.

As described above, the series resonant converter 123 repeats a process of turning on the PMOS transistor PM3 and the NMOS transistor NM4 and turning on the PMOS transistor PM4 and the NMOS transistor NM3 to generate the first power, which is the AC power. The generated first power is applied to the central coil 131 to thereby be transmitted to the power receiving apparatus 200.

Here, in the case in which the PMOS transistor PM4 and the NMOS transistor NM3 changes from the turn-off to the turn-on immediately after the PMOS transistor PM3 and the NMOS transistor NM4 changes from the turn-on state to the turn-off state, the PMOS transistor PM3 and the NMOS transistor NM3 are simultaneously turned on or the PMOS transistor PM4 and the NMOS transistor NM4 are simultaneously turned on, such that they may be damaged.

Therefore, in the present invention, it is preferable that in the case in which the PMOS transistor PM4 and the NMOS transistor NM3 changes from the turn-off to the turn-on after the PMOS transistor PM3 and the NMOS transistor NM4 changes from the turn-on state to the turn-off state or the PMOS transistor PM3 and the NMOS transistor NM4 changes from the turn-off to the turn-on after the PMOS transistor PM4 and the NMOS transistor NM3 changes from the turn-on state to the turn-off state, a dead time is preset to prevent the PMOS transistor PM3 and the NMOS transistor NM3 from being simultaneously turned on or the PMOS transistor PM4 and the NMOS transistor NM4 from being simultaneously turned on.

In addition, in the case in which the PMOS transistor PM1 and the NMOS transistor NM2 of the series resonant converter 123 are turned on and the PMOS transistor PM2 and the NMOS transistor NM1 thereof are turned off by the driving signals A11 to A14 output by the driving diver 122, the operation power of the power supply terminal Vcc sequentially flows through the PMOS transistor PM1, the capacitor C2, the coil L2, the first switching unit 125, the first side coil 133, and the NMOS transistor NM2. Further, in the case in which the PMOS transistor PM1 and the NMOS transistor NM2 of the series resonant converter 123 are turned off and the PMOS transistor PM2 and the NMOS transistor NM1 thereof are turned on by the driving signals A11 to A14 output by the driving diver 122, the operation power of the power supply terminal Vcc sequentially flows through the PMOS transistor PM2, the first side coil 133, the first switching unit 125, the coil L2, the capacitor C2, and the NMOS transistor NM2.

As described above, the series resonant converter 123 repeats a process of turning on the PMOS transistor PM1 and the NMOS transistor NM2 and turning on the PMOS transistor PM2 and the NMOS transistor NM1 to generate the second power, which is the AC power. The generated second power is applied to the first side coil 133 to thereby be transmitted to the power receiving apparatus 200.

Here, the above-mentioned operation has been described under the assumption that the first switching unit 125 is in the connection state and the second switching unit 126 is in the disconnection state. In the case in which the first switching unit 125 is in the disconnection state and the second switching unit 126 is in the connection state, the second power is applied to the second side coil 135 instead of the first side coil 133 to thereby be transmitted to the power receiving apparatus 200.

In transmitting the power to the power receiving apparatus 200 as described above, the case in which the central coil 131 and the first side coil 133 are selected to transmit the power to the power receiving apparatus 200 may occur.

In this case, it is preferable that the central coil 131 and the first side coil 133 transmit the powers having a phase difference of 180 degrees therebetween.

To this end, in the case in which the driving driver 122 generates all of the driving signals A11 to A14 and A21 to A24, it generates the driving signals A11 to A14 and the driving signals A21 to A24 so as to have a phase difference of 180 degrees therebetween, such that the central coil 131 and the first side coil 133 transmit the powers having the phase difference of 180 degrees therebetween to the power receiving apparatus 200.

Figure 6:
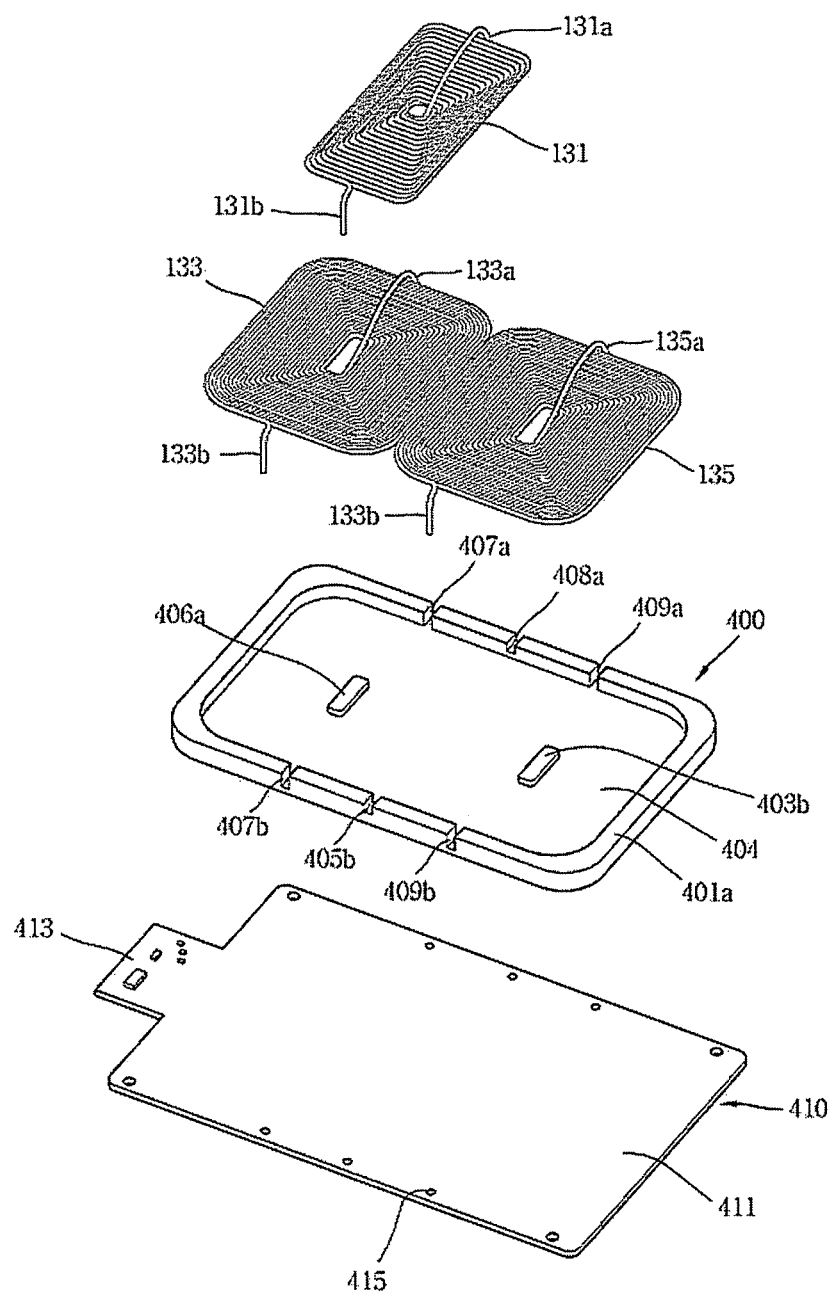
FIG. 6 is an exploded perspective view showing main components of a core assembly in the wireless power transmitting apparatus according to the exemplary embodiment of the present invention.
Figure 7:
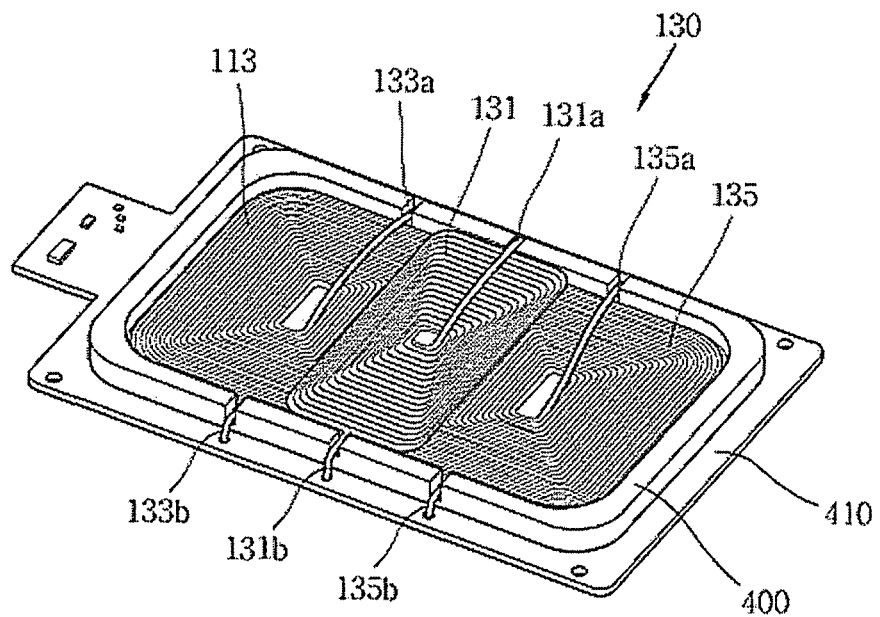
FIG. 7 is an assembled perspective view showing main components of the core assembly in the wireless power transmitting apparatus according to the exemplary embodiment of the present invention.

Further, in the case in which the central coil 131 and the second side coil 135 are selected to transmit the power to the power receiving apparatus 200, it is also preferable that the central coil 131 and the second side coil 135 transmit the powers having a phase difference of 180 degrees therebetween FIG. 6 is an exploded perspective view showing main components of a core assembly 130 in the wireless power transmitting apparatus 100 according to the exemplary embodiment of the present invention; and FIG. 7 is an assembled perspective view of the core assembly 130 in the wireless power transmitting apparatus 100 according to the exemplary embodiment of the present invention; Referring to FIGS. 6 and 7, the core assembly 130 according to the exemplary embodiment of the present invention includes one central coil 131, two side coils 133 and 135, a core 400, and a circuit board 410.

The one central coil 131 and the two side coils 133 and 135 have a form in which they are wound in the same direction. Although the case in which the one central coil 131 and the two side coils 133 and 135 are generally wound in a track shape (rectangular shape) is shown in FIGS. 6 and 7, the one central coil 131 and the two side coils 133 and 135 may also be wound in an oval shape.

Further, although not shown, even though the first and second side coils 133 and 135 are wound in the rectangular shape, the central coil 131 may also be wound in the track shape. In this case, the central coil 131 wound in the track shape increases a degree of freedom in a position of the power receiving apparatus 200.

As the central coil 131 and the first and second side coils 133 and 135, various types of wires such as a Litz type of wire manufactured in a scheme of twisting several strands of wires, a USTC wire, a poly-urethane enameled (UEW) wire, a polyurethane enameled (PEW) wire, a triple insulated wire (TIW), and the like, may be used.

Describing a position relationship between the one central coil 131 and the two side coils 133 and 135, the first and second side coils 133 and 135 are disposed at a lower side, and the central coil 131 is disposed on the first and second side coils 133 and 135. Therefore, in the case in which it is assumed that the central coil 131 is positioned at a first level, the first and second side coils 133 and 135 may be positioned at a different level from the first level, more specifically, at a second level lower than the first level. According to this disposition, a portion of each of the first and second side coils 133 and 135 is overlapped with the central coil 131, such that it is not exposed to the outside.

The core 400 is made of a magnetic material and receives the one central coil 131 and the two side coils 133 and 135 therein. In addition, the core 400 may be formed in a plate shape. In the exemplary embodiment of the present invention, the case in which the core 400 generally has a rectangular parallelepiped shape is described by way of example. More specifically, the core 400 is formed in the rectangular parallelepiped shape, and four edges of the core 400 have a rounded shape.

The circuit board 410 is disposed at a lower side of the core 400 so as to face a lower surface of the core 400. Further, the circuit board 410 has an area wider than that of the core 400. Therefore, one portion 411 (See FIG. 6) of the circuit board 410 supports the core 400 at the lower side of the core 400. In addition, the other portion 413 (See FIG. 6) of the circuit board 410 may be disposed with components of the power transmitting unit 120 for supplying the power to the one central coil 131 and the first and second side coils 133 and 135.

In addition, the circuit board 410 and the core 400 may include at least one shielding layer or insulating layer (not shown) disposed therebetween. The shielding layer or insulating layer reduces the power transmitting unit 120 disposed on the circuit board 410 from being influenced by magnetic fields generated from the one central coil 131 and the first and second side coils 133 and 135.

A configuration of the core assembly 130 according to the exemplary embodiment of the present invention as described above will be described in more detail.

The core assembly 130 according to the exemplary embodiment of the present invention includes one central coil 131 and two side coils 133 and 135 having a different size (area) from that of the one central coil 131. In the exemplary embodiment of the present invention, the one central coil 131 has a size smaller than that of each of the first and second side coils 133 and 135 and is positioned on the first and second side coils 133 and 135. In addition, the one central coil 131 may also have a size equal to or larger than that of each of the first and second side coils 133 and 135, as needed.

The central coil 131 may have two end portions 131*a* and 131*b*, and each of the first and second side coils 133 and 135 may also have two end portions 133*a* and 133*b*, and 135*a* and 135*b*.

A circumferential surface of the core 400 included in the core assembly 130 is provided with a concave part 401 formed in order to receive the central coil 131 and the first and second side coils 133 and 135 therein. The concave part 401 is defined by a sidewall 401*a* protruding upwardly along an outer circumferential edge of the core 400.

In addition, the sidewall 401*a* is provided with a plurality of extension grooves 405*a*, 405*b*, 407*a*, 407*b*, 409*a*, and 409*b* allowing the concave part 401 to be in communication with the outside. Both end portions 131*a* and 131*b* of the central coil 131 are extended to the outside through the extension grooves 405*a* and 405*b*, both end portions 133*a* and 133*b* of the first side coil 133 are extended through the extension grooves 407*a* and 407*b*, and both end portions 135*a* and 135*b* of the second side coil 135 are extended to the outside through the extension grooves 409*a* and 409*b*.

The core 400 is made of the magnetic material and shields magnetic fields deviating from a direction toward the power receiving apparatus 200 in magnetic fields generated by the power supplied to the central coil 131 and the first and second side coils 133 and 135 that are received in the concave part 401.

In addition, the concave part 401 is recessed so as to have a closed curved line shaped contour, more specifically, a rectangular or oval contour. In addition, the concave part 401 may have a size enough to tightly receive an outer circumference formed by the central coil 131 and the first and second side coils 133 and 135 that are disposed in parallel with each other.

Therefore, the first and second coils 133 and 135 may be fixed at a set position in the concave part 401 of the core 400 only by being received in the concave part 401 of the core 400.

The sidewall 401*a* has a height corresponding to a depth at which the concave 401 is recessed. In addition, the sidewall 401*a* may have a height corresponding to the sum of thicknesses of the central coil 131 and the first and second coils 133 and 135 and be formed to block or alleviate the magnetic fields generated by the power applied to the central coil 131 and the first and second side coils 133 and 135 from being leaked toward the sidewall 401*a*.

Further, an inner surface of the sidewall 401*a* contacts outer circumferences of the central coil 131 and the first and second side coils 133 and 135 tightly received as described above to fix the central coil 131 and the first and second side coils 133 and 135 at a predetermined position.

The concave part 401 may include two supports 403*a* and 403*b* protrudedly formed on a bottom surface thereof. The two supports 403*a* and 403*b* are formed at positions at which they may be inserted into hollow parts formed at the center of the first and second side coils 133 and 135, respectively. Therefore, the two supports 403*a* and 403*b* may allow the first and second side coils 133 and 135 to be fixed as set by a disposition relationship therebetween without deviating from set positions.

The supports 403*a* and 403*b* may have shapes corresponding to those of inner circumferential surfaces of the hollow parts of the first and second side coils 133 and 135, respectively. In the exemplary embodiment of the present invention, outer circumferences of the supports 403*a* and 403*b* have curved sections, corresponding to inner circumferential surfaces of the hollowing parts having a curved shape. Unlike positions of the first and second side coils 133 and 135, a position of the central coil 131 may be determined in a scheme of attaching the central coil 131 onto the first and second side coils 133 and 135 using a double-sided tape.

In addition, the side wall 401*a* is provided with the plurality of extension grooves 405*a*, 405*b*, 407*a*, 407*b*, 409*a*, and 409*b* allowing the concave part 401 to be in communication with the outside. The pair of extension grooves 405*a* and 405*b* is formed at positions corresponding to both end portions 131*a* and 131*b* of the central coil 131, the pair of extension grooves 407*a* and 407*b* is formed at positions corresponding to both end portions 133*a* and 133*b* of the first side coil 133, and the pair of extension grooves 409*a* and 409*b* is formed at positions corresponding to both end portions 135*a* and 135*b* of the second side coil 135.

An upper surface of the circuit board 410 is disposed to face a lower surface of the core 400. In addition, six through-holes 415 corresponding to the above-mentioned extension grooves 405*a*, 405*b*, 407*a*, 407*b*, 409*a*, and 409*b* are formed along a long side of the circuit board 410. Both end portions 131*a* and 131*b* of the central coil 131, both end portions 133*a* and 133*b* of the first side coil 133, and both end portions 135*a* and 135*b* of the second side coil 135 that pass through the through-holes 415 are connected to circuit patterns (not shown) formed on a lower surface of the circuit board 410, respectively.

Figure 8A:
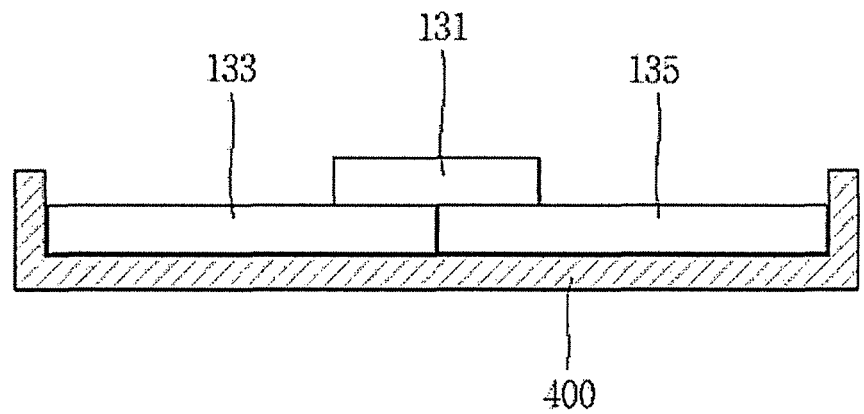
FIGS. 8A to 8C are cross-sectional views describing a state in which two side coils included in a core assembly in the wireless power transmitting apparatus according to the exemplary embodiment of the present invention are disposed.

Further, the first and second side coils 133 and 135 may be configured to contact each other, as shown in FIG. 8A.

Figure 8B:
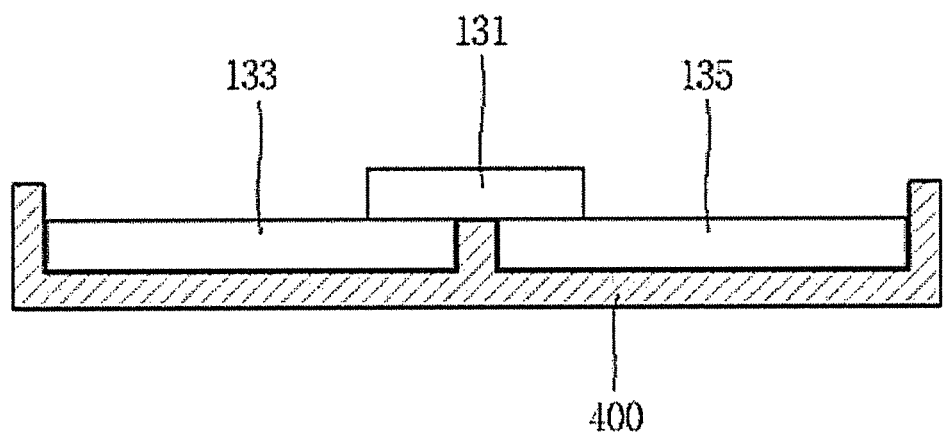

Further, the first and second side coils 133 and 135 may be installed to be spaced apart from each other by a predetermined interval, as shown in FIG. 8B.

In the case in which the first and second side coils 133 and 135 are installed to be spaced apart from each other by the predetermined interval, the core 400 may be protrudedly formed between the first and second side coils 133 and 135.

Figure 8C:
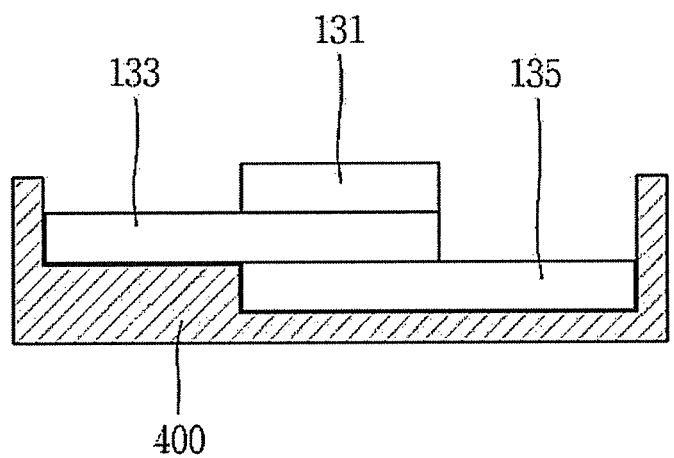

Further, the first and second side coils 133 and 135 may be disposed to be partially overlapped with each other, as shown in FIG. 8C. In the case in which the first and second side coils 133 and 135 are disposed to be partially overlapped with each other, the core 400 may be configured to be provided with a step so as to receive the first and second side coils 133 and 135.

Although the case in which a portion of the first side coil 133 is overlapped with an upper portion of the second side coil 135 is shown by way of example in FIG. 8C, a portion of the second side coil 135 may also be overlapped with an upper portion of the first side coil 133.

Next, a relationship between the one central coil 131 and the first and second side coils 133 and 135 will be described with reference to FIGS. 9 and 10.

Figure 9:
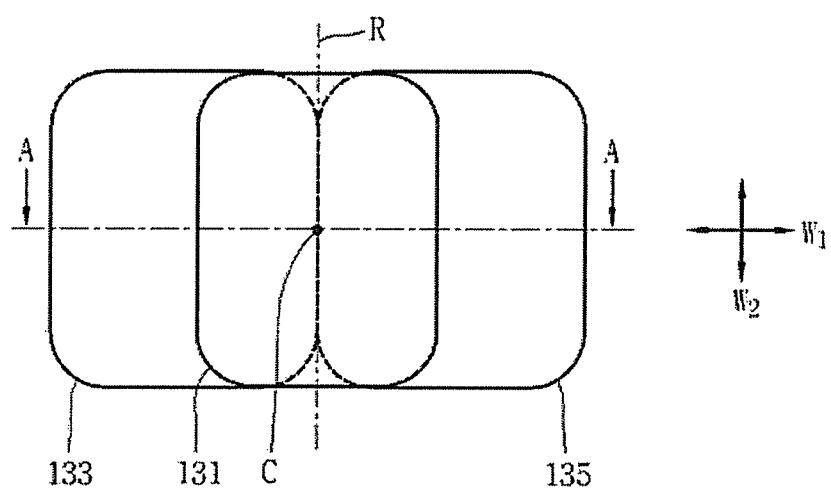
FIG. 9 is a plan view describing a concept for one central coil and two side coils included in the core assembly in the wireless power transmitting apparatus according to the exemplary embodiment of the present invention.
Figure 10:
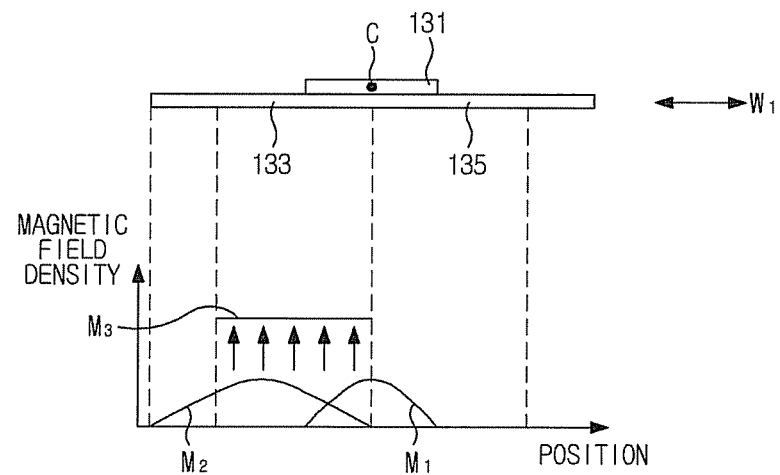
FIG. 10 is a diagram describing an operation of selecting a central coil and a first side coil included in the core assembly in the wireless power transmitting apparatus according to the exemplary embodiment of the present invention as a power transmitting coil and transmitting a power.

FIG. 9 is a plan view describing a concept for a central coil and side coils included in the core assembly in the wireless power transmitting apparatus according to the exemplary embodiment of the present invention; and FIG. 10 is a diagram describing an operation of transmitting power to a power receiving apparatus with reference to a cross-sectional view taken along the line A-A of FIG. 9. In FIGS. 9 and 10, the case in which the first and second side coils 133 and 135 are configured to contact each other as shown in FIG. 8A is shown by way of example.

Referring to FIGS. 9 and 10, the central coil 131 has a width narrower than that of each of the first and second side coils 133 and 135 in a first direction W1 which is a transversal direction on the drawing. In addition, the central coil 131 has the same width as that of each of the first and second side coils 133 and 135 in a second direction W2.

Therefore, portions of the first and second side coils 133 and 135 that deviate from the central coil 131 are exposed upwardly.

Here, the width of the central coil 131 in the first direction W1 may be in the range of 30 to 50% of the sum of widths of the first and second side coils 133 and 135.

Unlike that there is a difference in a size in the first direction W1, the central coil 131 may have the same width as those of the first and second side coils 133 and 135 in the second direction W2. Further, the first and second side coils 133 and 135 may have the same size. Here, the first and second direction W1 and W2 are generally perpendicular to each other, and each of the central coil 131 and the first and second side coils 133 and 135 may generally have a rectangular shape.

In addition, sides at which the first and second side coils 133 and 135 face each other may meet each other on a line R passing through the center C of the central coil 131.

With this configuration, the central coil 131 is positioned at the center of the entire core assembly 130, such that it may be set as a basic coil for transmitting the power. Therefore, when a user positions the power receiving apparatus 200 approximately at the center of the charger, the power may be transmitted by the central coil 131 to thereby be charged in the battery cell module 230. When the power receiving apparatus 230 deviates from the center of the charger, the first side coil 133 or the second side coil 135 may aid the center coil 131 to transmit the power.

Here, both of the first and second side coils 133 and 135 are positioned at a level beneath the central coil 131, such that they are not significantly distant from the power receiving apparatus 200. Therefore, it is possible to reduce efficiency of the power transmission to the power receiving apparatus 200 from being deteriorated due to excessively spaced coils.

In addition, under the control of the power transmission controlling unit 121 according to the exemplary embodiment of the present invention, in the case in which the central coil 131 transmits the power to the power receiving apparatus 200, the power is supplied to at least one of the first and second side coils 133 and 135, such that at least one of the first and second side coils 133 and 135 may transmit the power together with the central coil 200.

In this case, the magnetic field generated by the first or second side coil 133 or 135 transmitting the power supplements the magnetic field generated by the central coil 131.

Therefore, the power receiving apparatus 200 may uniformly receive the power by the uniform magnetic field.

More specifically, FIG. 10 illustrates a situation in which in the state in which the power is supplied to the central coil 131 to thereby be transmitted to the power transmitting apparatus 200, the power is applied to the first side coil 133, such that the first side coil 133 transmits the power the power receiving apparatus 200 together with the central coil 131.

A magnetic field density M1 by the central coil 131 has a form in which it is decreased from the center C of the central coil 131 toward an end portion thereof. In addition, a magnetic field density M2 by the first side coil 133 has a form similar to that of the magnetic field density M1 by the central coil 131.

However, the magnetic field by the central coil 131 and the magnetic field by the first side coil 133 are supplemented with each other, such that a portion at which the central coil 131 and the first side coil 133 are overlapped with each other satisfies a higher level of magnetic field density M3.

In this case, since the wireless power transmitting apparatus 100 may apply the power to the central coil 131 and the first side coil 133 on halves to transmit to the power receiving apparatus 200, thermal stress of the central coil 131 and the first side coil 133 may be reduced and the power loss may also be reduced.

Figure 11:
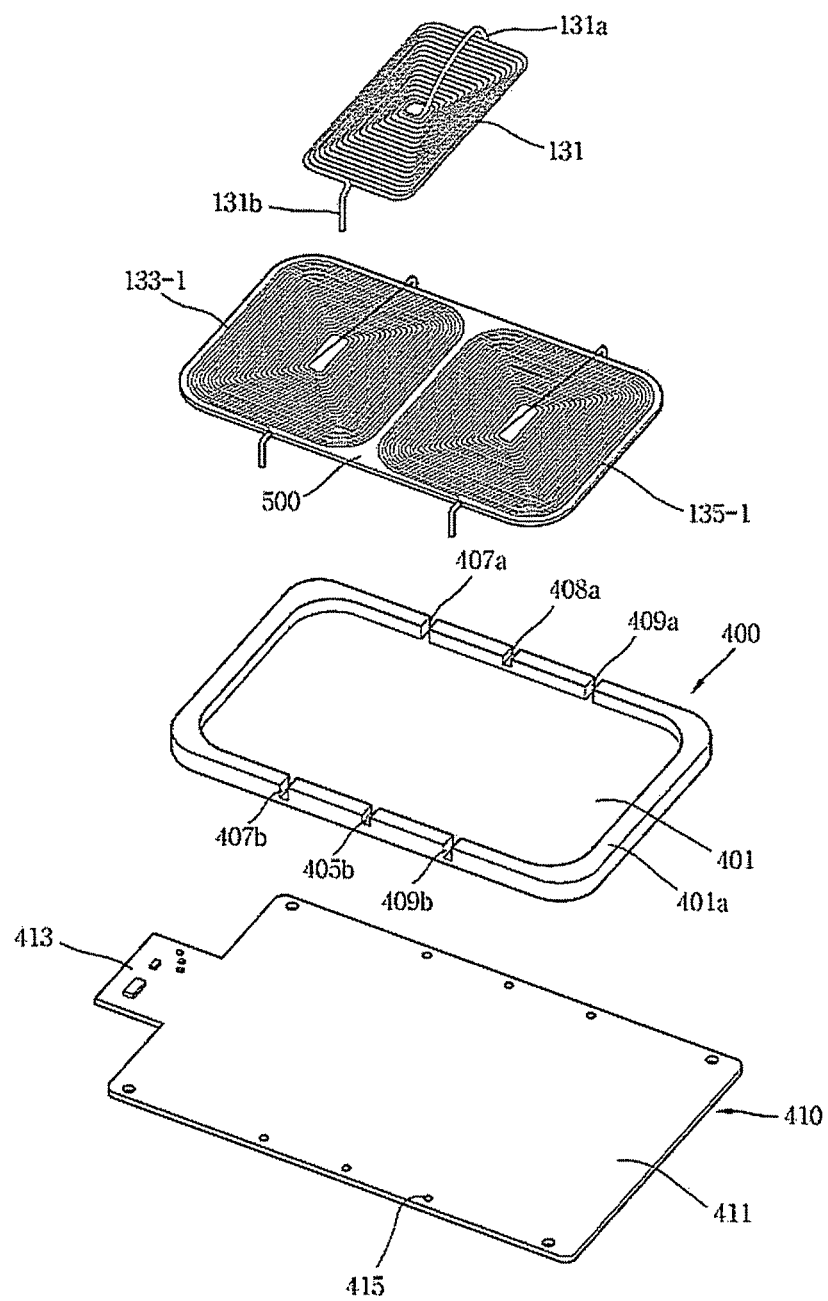
FIG. 11 is an exploded perspective view showing a configuration of a core assembly in the wireless power transmitting apparatus according to another exemplary embodiment of the present invention.

Next, another modified example of a core assembly 130 will be described with reference to FIG. 11. FIG. 11 is an exploded perspective view showing a configuration of a core assembly 130 in the wireless power transmitting apparatus 100 according to another exemplary embodiment of the present invention. Referring to FIG. 11, the core assembly 130 according to another exemplary embodiment of the present invention is substantially similar to the core assembly 130 according to the exemplary embodiment of the present invention described above except for shapes of the first and second side coils 133 and 135 described above.

More specifically, the core assembly 130 according to another exemplary embodiment of the present invention may further include a base 500, which is an insulator, at a lower portion of the central coil 131, and the first and second side coils 133 and 135 may be formed as first and second conductive patterns 133-1 and 135-1 formed as patterns on the base 500, respectively. Each of the first and second conductive patterns 133-1 and 135-1 is formed in a planar shape and has a form in which a metal band is extended in a spiral shape.

The first and second conductive patterns 133-1 and 135-1 may be formed at a time by attaching a metal plate, for example, a copper plate on the base 500 and then performing an etching process thereon. The first and second conductive patterns 133-1 and 135-1 are formed as a single member through the medium of the base 500, thereby making it possible to simplify a process of assembling the core assembly 130. In addition, the supports 403a and 403b (See FIG. 6) may not be needed in the core 400.

Further, the first and second conductive patterns 133-1 and 135-1 may be formed to be thinner than the above-mentioned first and second side coils 133 and 135.

Therefore, a distance from the center of the first and second conductive patterns 133-1 and 135-1 in a thickness direction to the power receiving apparatus 200 is closer than a distance from the first and second side coils 133 and 135 to the power receiving apparatus 200. Therefore, efficiency of the wireless power transmission to the power receiving apparatus 200 may be improved.

Finally, still another modified example of a core assembly 130 will be described with reference to FIG. 12.

Figure 12:
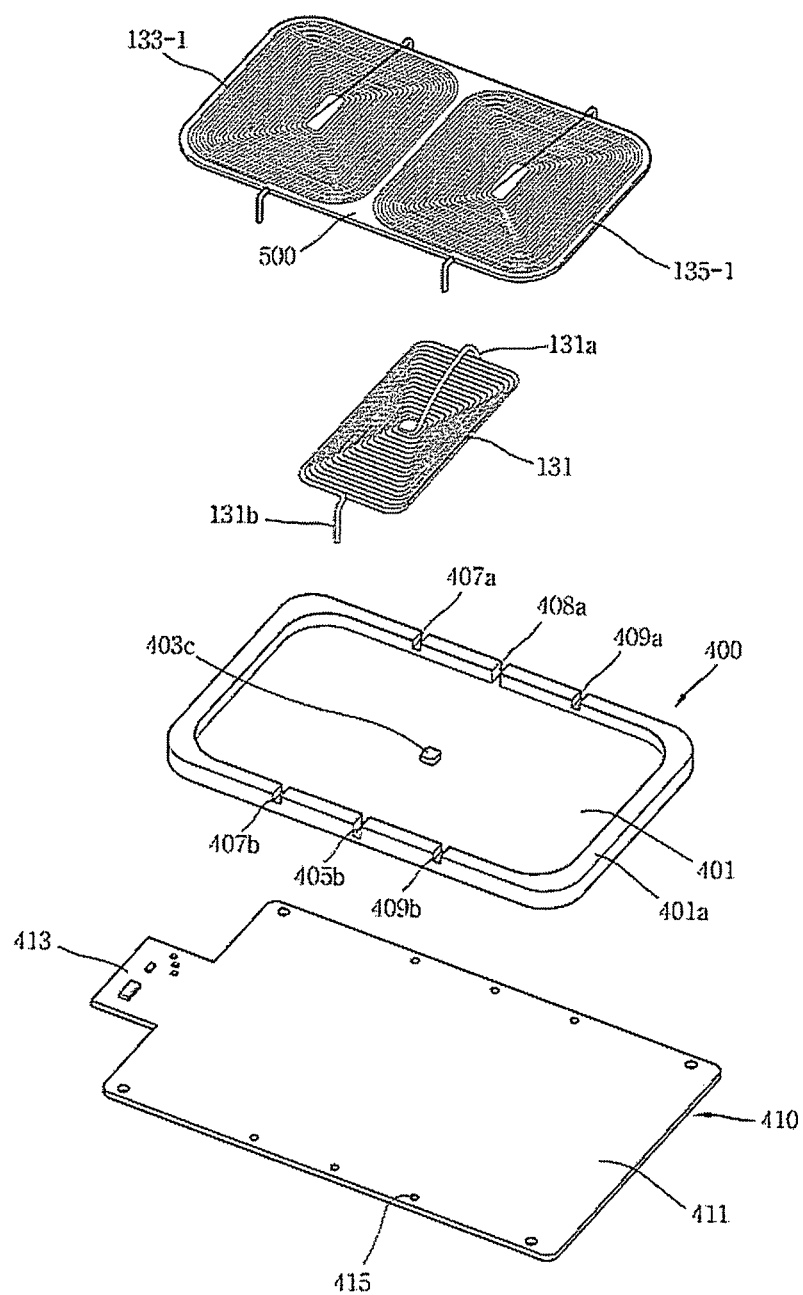
FIG. 12 is an exploded perspective view showing a configuration of a core assembly in the wireless power transmitting apparatus according to still another exemplary embodiment of the present invention.

FIG. 12 is an exploded perspective view showing a configuration of a core assembly 130 in the wireless power transmitting apparatus 100 according to still another exemplary embodiment of the present invention. Referring to FIG. 12, the core assembly 130 according to still another exemplary embodiment of the present invention is substantially similar to the core assembly 130 according to another embodiment of the present invention shown in FIG. 11 except that the central coil 131 is disposed at a lower portion of the base 500 on which the first and second conductive patterns 133-1 and 135-1 are formed.

In this case, since the first and second conductive patterns 133-1 and 135-1 are formed as patterns on the base 500, they have a significantly thin thickness.

Therefore, in the case in which the power receiving apparatus 200 is positioned on the charger, an interval between the central coil 131 and the power receiving coils 210 of the power receiving apparatus 200 may be within an effective distance in which the power may be wirelessly transmitted.

The core 400 may include a support 403c protrudedly formed on a bottom thereof, corresponding to the central coil 131 disposed at a lower portion of the first and second conductive patterns 133-1 and 135-1. The support 403c may have a shape corresponding to the hollow part of the central coil 111 and be formed at the center of the bottom surface of the concave part 401.

In the wireless power transmitting apparatus and method according to the exemplary embodiment of the present invention, the power is sequentially applied to the one central coil and the two side coils to thereby be transmitted to the power receiving apparatus, the reception power amount received in the power receiving apparatus is judged, at least one of the one central coil and the two side coils is selected as the power transmitting coil by the judged reception power amount, and the power is supplied to the selected power transmitting coil to thereby be transmitted to the power receiving apparatus.

Therefore, the power may be transmitted at the optimal state regardless of the position of the charger at which the power receiving apparatus is positioned.

Further, in the case in which the vibration, or the like, occurs in the portable terminal in which the power receiving apparatus is mounted in the state of transmitting the power to the power receiving apparatus to charge the power in the battery cell module, to move the power receiving apparatus, thereby decreasing the reception power amount, the power is again applied sequentially to the one central coil and the two side coils to thereby be transmitted to the power receiving apparatus, the reception power amount received by the power receiving apparatus is judged, at least one of the one central coil and the two side coils is selected as the power transmitting coil by the judged reception power amount, and the power is supplied to the selected power transmitting coil to thereby be transmitted to the power receiving apparatus.

Therefore, even though the power receiving apparatus moves in the state of transmitting the power to the power receiving apparatus to charge the power in the battery cell module, the power may be always transmitted in the optimal state.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A wireless power transmitting apparatus comprising:
a core assembly including one central coil, and two side coils to transmit a power to a power receiving apparatus, the two side coil including a first side coil and a second side coil; and
a power transmitting unit configured to receive a reception power amount measured by the power receiving apparatus receiving wireless power transmitted from each of the one central coil and the two side coils from the power receiving apparatus, to perform a first coil selection which includes selecting any one of the one central coil and the two side coils as a power transmitting coil or selecting the one central coil and any one of the two side coils as a power transmitting coil by the received reception power amount, to perform a transmission of the power to the power receiving apparatus through the selected power transmitting coil, to judge whether or not a charging completion signal is received from the power receiving apparatus, and to judge whether or not the reception power amount has been decreased,
wherein the power transmitting unit repeatedly performs the transmission of the power through the selected power transmitting coil when it is judged that the charging completion signal is not received and the reception power amount has not been decreased, and
wherein the power transmitting unit performs a second coil selection when it is judged that the charging completion signal is not received and the reception power amount has been decreased, wherein the second coil selection includes sequentially applying the power to the one central coil and the two side coils and judging the reception power amount transmitted from the power receiving apparatus,
wherein the core assembly includes:
the central coil installed at a first level;
the first side coil installed at a second level different from the first level;
the second side coil installed at a third level different from the first level and the second level; and
a magnetic core having at least a step, wherein the step is formed to receive the first side coil and the second side coil at the different levels.

2. The wireless power transmitting apparatus of claim 1, wherein the power transmitting unit includes:
a power transmission controlling unit configured to control the transmission of the power;
a driving driver configured to generate a driving signal under the control of the power transmission controlling unit;

a series resonant converter configured to switch a direct current (DC) power by the driving signal to generate a first power and a second power and apply the first power to the central coil;

a side coil driving unit configured to selectively generate a first side coil driving signal and a second side coil driving signal under the control of the power transmission controlling unit so as to allow the second power to be applied to at least one of the first side coil and the second side coil; and a signal receiving unit receiving a reception power amount signal and the charging completion signal transmitted by the power receiving apparatus to provide the reception power amount signal and the charging completion signal to the power transmission controlling unit.

3. The wireless power transmitting apparatus of claim 2, further comprising a first switching unit and a second switching unit selectively connected to the first side coil and the second side coil by the first side coil driving signal and the second side coil driving signal to selectively apply the second power to the first side coil and the second side coil.

4. The wireless power transmitting apparatus of claim 2, wherein a phase difference between the first power applied to the central coil and the second power applied to the first side coil or the second side coil is 180 degrees.

5. The wireless power transmitting apparatus of claim 4, wherein the series resonant converter allows the first power applied to the central coil and the second power applied to the first side coil or the second side coil to have the phase difference of 180 degrees therebetween in the case in which both of the first power and the second power are generated.

6. The wireless power transmitting apparatus of claim 1, wherein the central coil has a different size from that of each of the first side coil and the second side coil.

7. The wireless power transmitting apparatus of claim 6, wherein a width of the central coil in a first direction is narrower than that of each of the first side coil and the second side coil in the first direction.

8. The wireless power transmitting apparatus of claim 7, wherein the width of the central coil in the first direction is in the range of 30 to 50% of the sum of widths of the first side coil and the second side coil in the first direction.

9. The wireless power transmitting apparatus of claim 7, wherein a width of the central coil in a second direction is the same as that of each of the first side coil and the second side coil in the second direction.

10. The wireless power transmitting apparatus of claim 1, wherein the first side coil and the second side coil are a first conductive pattern and a second conductive pattern formed as patterns on a base, which is an insulator, disposed at a lower side of the central coil, respectively.

11. The wireless power transmitting apparatus of claim 1, wherein the central coil is disposed on the first side coil and the second side coil.

12. The wireless power transmitting apparatus of claim 11, wherein the first side coil and the second side coil have the same size.

* * * * *